US006600248B2

(12) United States Patent
Hara et al.

(10) Patent No.: US 6,600,248 B2
(45) Date of Patent: Jul. 29, 2003

(54) MOUNTING ARRANGEMENT OF VEHICLE ROTARY ELECTRIC MACHINE

(75) Inventors: Noriyuki Hara, Ichinomiya (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 09/843,696

(22) Filed: Apr. 30, 2001

(65) Prior Publication Data

US 2002/0002099 A1 Jan. 3, 2002

(30) Foreign Application Priority Data

Jun. 30, 2000 (JP) ....................................... 2000-198257

(51) Int. Cl.[7] .................................................. H02K 5/00
(52) U.S. Cl. ........................................... 310/91; 310/89
(58) Field of Search ............................. 310/91, 89, 66, 310/40 R

(56) References Cited

U.S. PATENT DOCUMENTS

| | | | | |
|---|---|---|---|---|
| 3,983,429 A | * 9/1976 | Allardice, Jr. | ............... | 310/91 |
| 4,039,872 A | * 8/1977 | Armor et al. | ................. | 310/55 |
| 4,835,428 A | * 5/1989 | Komurasaki et al. | ......... | 310/91 |
| 5,696,415 A | * 12/1997 | Fujimoto et al. | ............. | 310/91 |
| 5,760,513 A | * 6/1998 | Morishita et al. | ............. | 310/91 |
| 6,124,567 A | * 9/2000 | Feldhausen et al. | .......... | 310/52 |

FOREIGN PATENT DOCUMENTS

| | | | |
|---|---|---|---|
| FR | 2327665 A * | 6/1977 | ............ H02K/5/26 |
| JP | 59-183031 | 10/1984 | |
| JP | 62-39008 | 3/1987 | |
| JP | 2-41650 | 3/1990 | |
| JP | 4-84751 | 7/1992 | |
| JP | 8-282294 | 10/1996 | |
| JP | 10-248191 | 9/1998 | |
| JP | 10-324102 | 12/1998 | |
| WO | WO 8602788 A * | 5/1986 | ............ H02K/5/00 |

* cited by examiner

*Primary Examiner*—Nestor Ramirez
*Assistant Examiner*—Guillermo Perez
(74) *Attorney, Agent, or Firm*—Oliff & Berridge, PLC

(57) ABSTRACT

A vehicle rotary electric machine to be mounted in an engine is comprised of a rotor having a shaft, a stator, a front housing, a rear housing and a pulley. The front housing has a first mounting stay disposed at a side of the front housing to be fixed to a cylinder block of an engine by a bolt and a second mounting stay disposed at the opposite side of the front housing with respect to the shaft to be fixed to a cylinder head of the engine by a bolt having the same outside diameter. The rear housing has a third mounting stay to be fixed to the cylinder head at the same side of the rear housing as the second mounting stay. The first mounting stay has an elliptical first bolt-hole extending perpendicularly to the stack direction. The a major axis of the elliptical hole extends in parallel to the stack direction.

11 Claims, 3 Drawing Sheets

MOUNTING ARRANGEMENT OF VEHICLE ROTARY ELECTRIC MACHINE

CROSS REFERENCE TO RELATED APPLICATION

The present application is based on and claims priority from Japanese Patent Application 2000-198257, filed Jun. 30, 2000, the contents of which are incorporated herein by reference.

BACKGROUND OF THE INVENTION

1. Field of the Invention

The present invention relates to a vehicle rotary electric machine and, particularly, an AC generator to be mounted on an engine.

2. Description of the Related Art

JP-A-2-414650 and JP-A-10-248191 disclose a side-mounting type AC generator that includes a pulley and a housing having a plurality of bolt-holes extending in a direction perpendicular to a shaft of the generator. Usually, such bolt-holes have a diameter that is much larger than the diameter of bolts so that the bolt-holes can absorb dispersion in positions of the female threads that are formed at an engine so that the generator can be easily mounted on the engine. In the meanwhile, it is very difficult to accurately position the cylinder head of the engine on the cylinder block thereof because both members are fastened by bolts to each other via a gasket.

As the diameter of the bolt-holes becomes larger, it becomes more difficult to locate the pulley of the AC generator at a proper position. If the pulley is not positioned properly, the friction loss of the belt may increase and the lifetime thereof may decrease. Therefore, it has been recommended that the bolt-holes are formed by a machine to provide an accurate diameter.

SUMMARY OF THE INVENTION

Therefore, a main object of the invention is to provide a pulley-driven vehicle rotary electric machine that has an improved bolt-fastening structure.

Another object of the invention is to provide a pulley-driven vehicle rotary electric machine that is easy to mount on an engine at a proper position where the friction loss o the belt may not increase.

In a vehicle rotary electric machine according to a feature of the invention, a housing has an elliptical first bolt-hole extending in a direction perpendicular to a shaft at a position outside an axial end of the housing and a circular second bolt-hole disposed at the opposite position with respect to the shaft to extend approximately in the same direction as the first bolt-hole. The elliptic second bolt-hole has a major axis approximately extending in a direction perpendicular to the shaft and a minor axis extending in the direction parallel to the shaft. The major axis may extend in a direction between −10° and 10° from said direction perpendicular to said shaft. The housing may have a circular third bolt-hole that is larger than the minor axis of the first bolt hole disposed at the same radial position as the second bolt-hole extending in parallel with the first bolt-hole.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
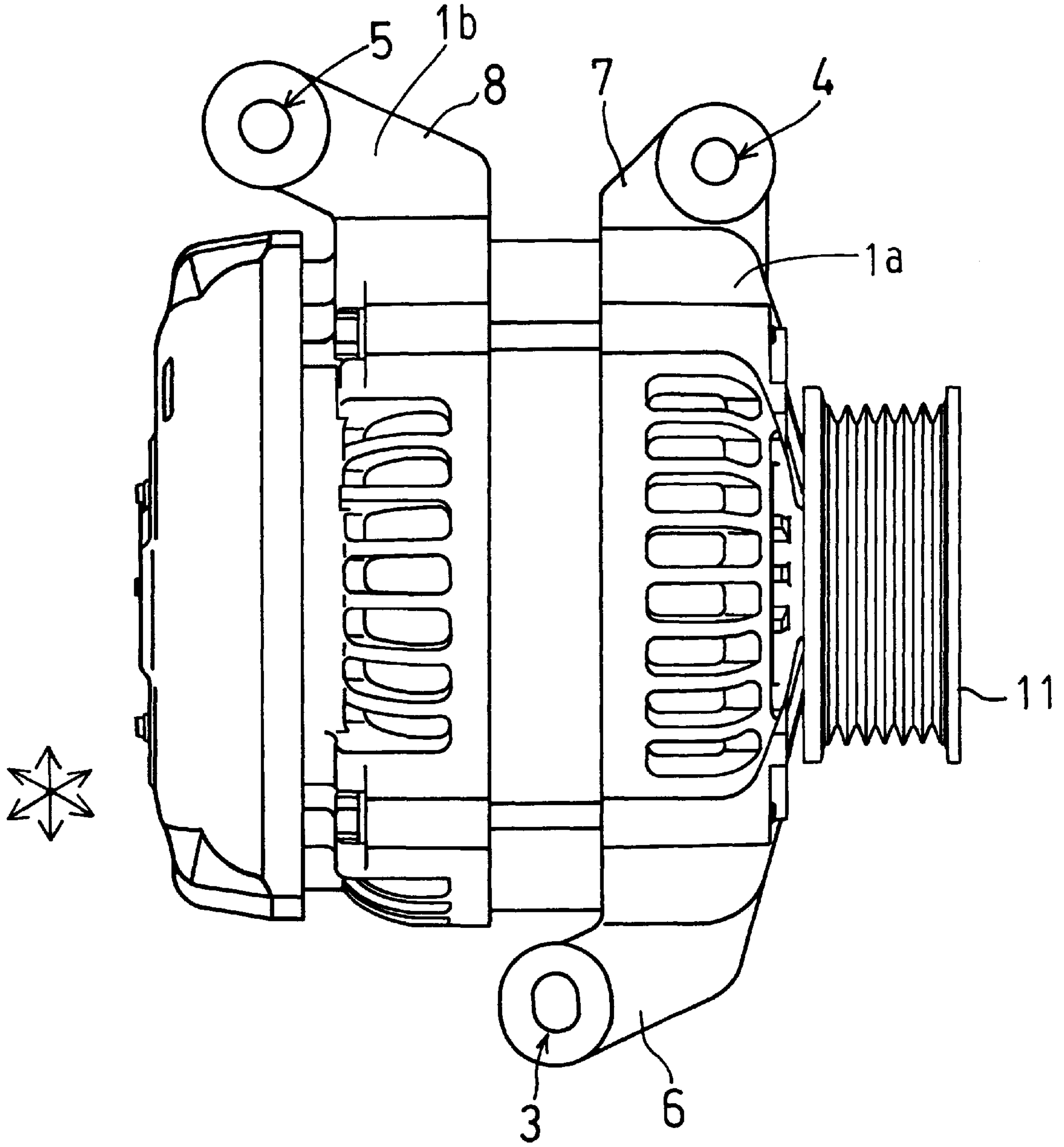
FIG. 1 is a side view illustrating a vehicle AC generator according to a first embodiment of the invention.

A vehicle AC generator according to a first embodiment of the invention is described with reference to FIGS. 1 and 2. In FIG. 1, the AC generator is comprised of a front housing 1*a*, a rear housing 1*b*, a shaft 2 and a pulley 11. The front housing 1*a* has a first mounting stay 6 having a first bolt-hole 3 and a second mounting stay 7 having a second bolt-hole 4. The rear housing 1*b* has a third mounting stay 8 having a third bolt-hole 5.

Figure 2:
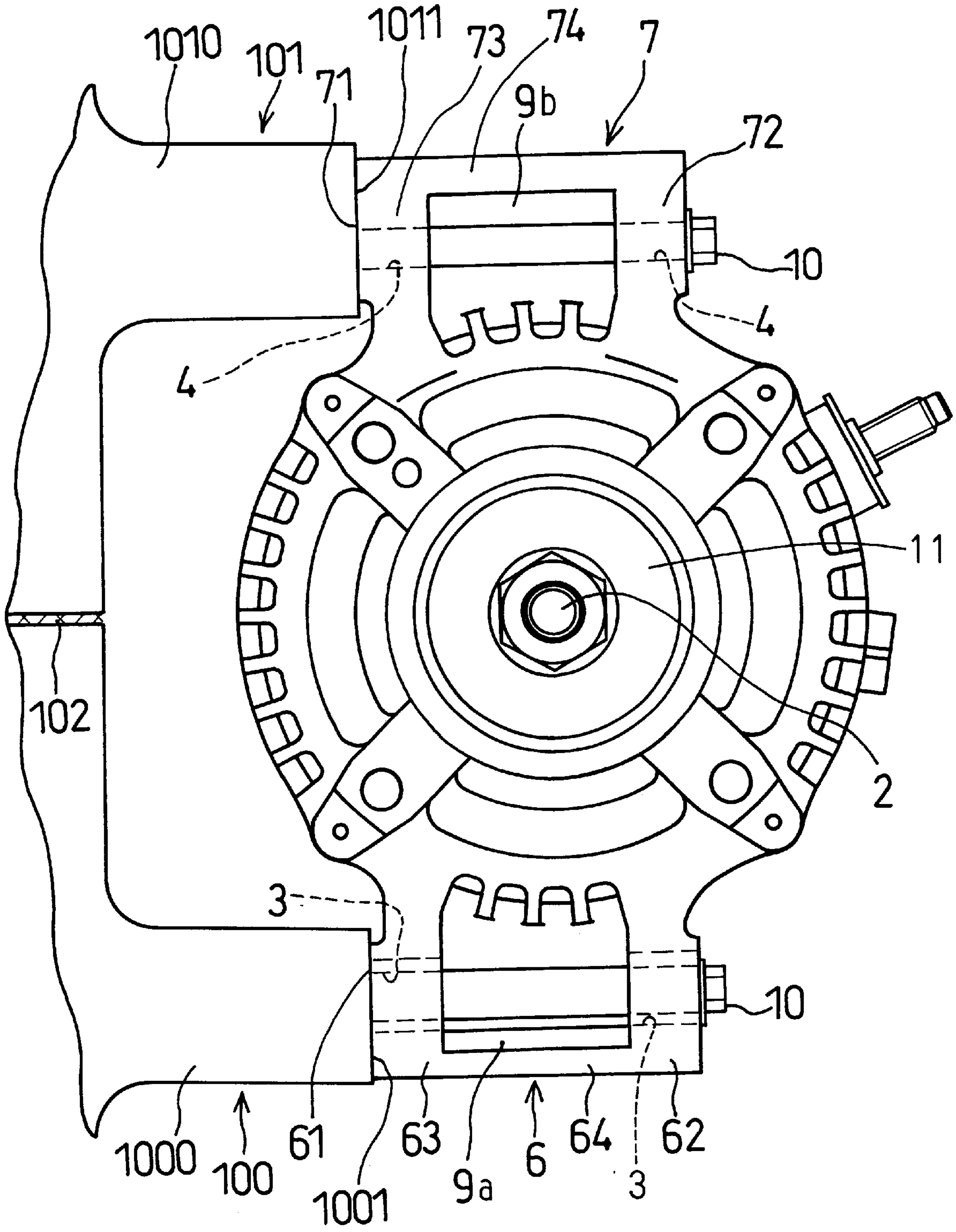
FIG. 2 is a front view of the vehicle AC generator illustrated in FIG. 1.

As shown in FIG. 2, the AC generator is mounted on an engine. The engine is comprised of a cylinder block 100, a cylinder head 101 and a gasket 102 disposed between the cylinder block 100 and the cylinder head 101.

The first mounting stay 6 is formed at the lower side of the front hosing 1*a* and has a flat mounting surface 61, a pair of spaced-apart cylindrical members 62 and 63 connected by a bridge member 64, which has a bolt-guide member 9*a*. The mounting surface 61 abuts a vertical mounting surface 1001 of a mounting projection 1000 of the cylinder block 100. The first bolt-hole 3 is formed in the pair of cylindrical portions 62 and 63 in the horizontal direction, which is perpendicular to the shaft 2.

The second mounting stay 7 is formed at the upper side of the front housing la and has a flat mounting surface 71, a pair of spaced-apart cylindrical portions 72 and 73 connected by a bridge member 74, which has a bolt-guide member 9*b*. The mounting surface 71 abuts a vertical mounting surface 1011 of a mounting projection 1010 of the cylinder head 101. The second bolt-hole 4 is formed in the pair of cylindrical portions 72 and 73 in the horizontal direction, which is perpendicular to the shaft 2.

The third mounting stay 8 is formed at the upper side of the rear housing 1*b* and has a flat surface, which abuts a mounting surface (not shown) of the cylinder head 101 in the same manner as the first and second mounting stays 6 and 7.

The AC generator is fixed to the engine by three fastening bolts 10 that are respectively inserted into the first, second and third bolt-holes 3, 4 and 5 and screwed into the female threads formed at the respective mounting surfaces of the engine. The continuous surface may be substituted by a plurality of spaced-apart guide surfaces. In this case, the last guide surface adjacent to the bolt-hole 3, 4 or 5 should be continuous so that the head of the bolt 10 can be smoothly guided into the bolt-hole 3, 4 or 5.

The first bolt-hole 3 is elliptical, as shown in FIG. 1, and has a major axis thereof in the vertical direction, in other words, in the stack direction of the cylinder head 101 on the cylinder block 100, as shown in FIG. 2. The minor axis of the first bolt-hole 3 is slightly larger than a outside diameter of the bolt 10. The bolt-guide member 9*a* has a continuous surface extending from the major axis side of the first bolt-holes 3. In other words, the distance between the axis of the bolt 10 and the continuous surface is the same as the radius of the first bolt-hole 3. The angular width of the continuous surface is between 1° and 45°, preferably, between 5° and 25° or between 10° and 20°.

The second and third bolt-holes 4 and 5 are circular. The second bolt-hole 4 has a diameter slightly larger than the outside diameter of the fastening bolts 10, but smaller than the minor axis of the first bolt-hole 3 and the diameter of the third bolt-hole 5. The bolt-guide member 9*b* has a continuous surface extending from the second bolt-holes 4.

When mounting the vehicle AC generator on the engine, one of the bolts 10 is firstly inserted into the first bolt-hole 3 and temporarily screwed into a female thread (not shown) of the mounting surface 1001 of the cylinder block 100. Then, the second bolt 10 is inserted into the second bolt-hole 4 and temporarily screwed into a female thread (not shown) of the mounting surface 1011 of the cylinder head 101. Subsequently, the third bolt 10 is inserted into the third bolt-hole 5 and temporarily screwed into a female thread (not shown) of another mounting surface of the cylinder head 101. Finally, the three bolts 10 are completely screwed in to the respective female threads.

Figure 3:
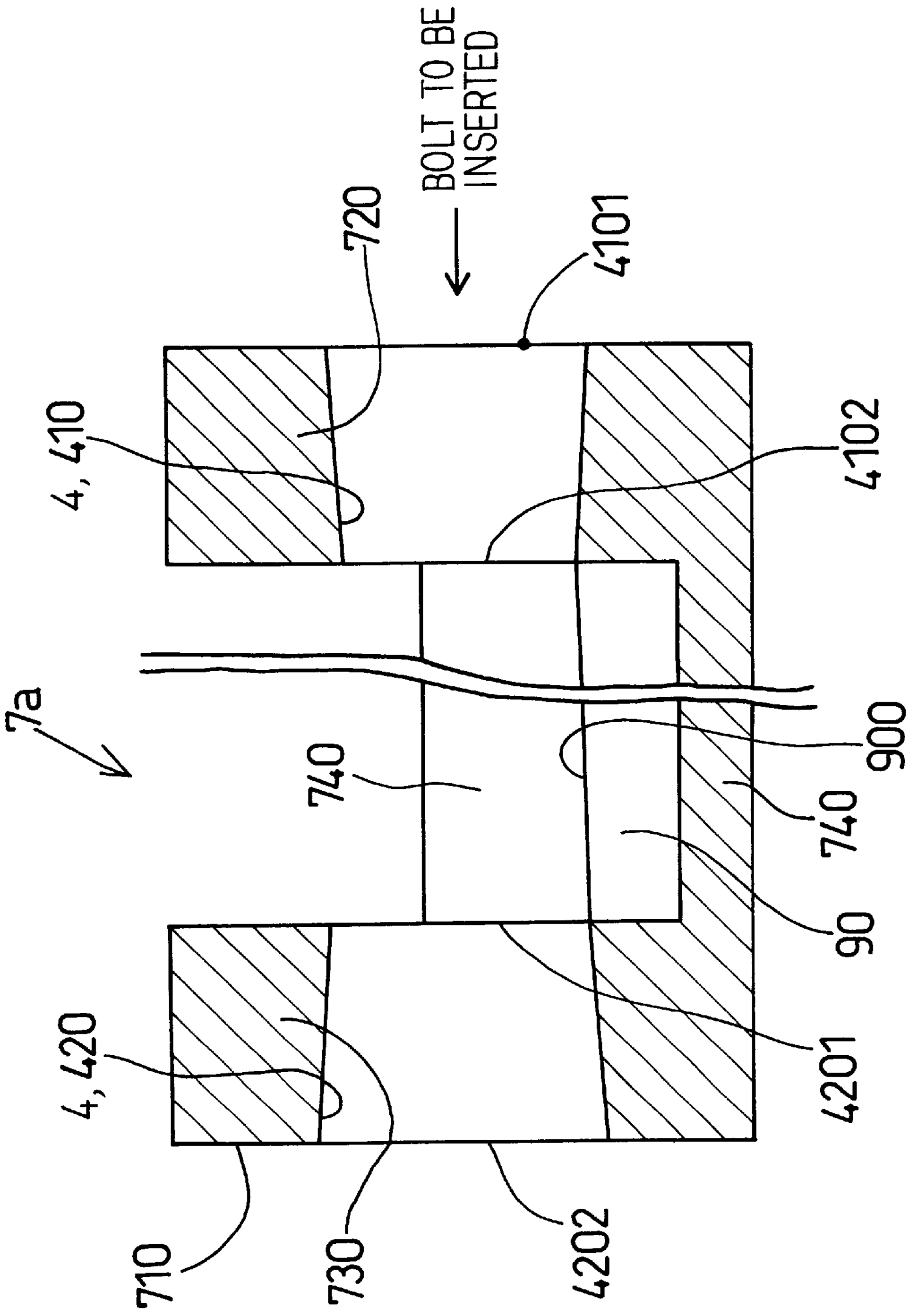
FIG. 3 is a schematic diagram illustrating a mounting stay of a vehicle AC generator according to a second embodiment of the invention.

A vehicle AC generator according to a second embodiment of the invention is described with reference to FIG. 3. The second mounting stay 7 of the first embodiment is substituted by a mounting stay 7*a*.

The mounting stay 7*a* has a pair of spaced-apart cylindrical portions 720 and 730 that is connected by a bridge member 740. The bolt-hole 4 is formed of a first tapering hole 410 that is formed in the cylindrical portion 720 from which the bolt 10 is inserted and a tapering hole 420 that is formed in the cylindrical portion 730 which is to abut the mounting surface 1011 of the cylinder head 101.

The first tapering hole 410 has a larger opening 4101 from which the bolt 10 is inserted, and the second tapering hole 420 has a larger opening 4202 from which the bolt 10 is screwed into the female thread of the cylinder head 101. The smaller opening 4201 of the second tapering hole 420 is larger than the smaller opening 4102 of the first tapering hole 410. Therefore, it is easy to insert the bolt 10 into the bolt-hole 4. In addition the tapering hole 420 allows conical motion of the head of the bolt 10 so that the head can be easily screwed into the female thread of the cylinder head 101. When the bolt 10 is completely fastened to the engine cylinder head 101, the smaller opening 4102 of the first tapering hole 410 is located at a proper position.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle rotary electric machine including a rotor having a shaft, a stator and a housing for supporting said rotor and stator, wherein said housing has an elliptical first bolt-hole extending in a direction perpendicular to said shaft at a position outside an axial end of said housing and a circular second bolt-hole disposed at the opposite position with respect to said shaft outside the same axial end of said housing to extend approximately in the same direction as said first bolt-hole, said elliptic first bolt-hole has a major axis approximately extending in a direction perpendicular to said shaft and a minor axis extending in the direction parallel to said shaft, and said second bolt hole is not larger in diameter than said minor axis.

2. The vehicle rotary electric machine as claimed in claim 1, wherein said major axis extends in a direction between −10° and 10° from said direction perpendicular to said shaft.

3. The vehicle rotary electric machine as claimed in claim 1, wherein said housing further has a circular third bolt-hole disposed at the same radial position as said second bolt-hole and at the other axial end of said housing to extend in parallel with said first bolt-hole, and said third bolt-hole is larger than the minor axis of said first bolt-hole.

4. The vehicle rotary electric machine as claimed in claim 1, wherein one of said first and second bolt-hole is fixed to a cylinder block of an engine and the other is fixed to a cylinder head of said engine, and said major axis of said first bolt-hole extends in a thickness direction of a gasket of said engine disposed between said cylinder head and cylinder block.

5. The vehicle rotary electric machine as claimed in claim 1, wherein said housing comprises a first mounting stay having said first bolt-hole and a second mounting stay having said second bolt-hole.

6. A vehicle rotary electric machine to be mounted in an engine having a cylinder head and a cylinder block stacked in a stack direction comprising:

a rotor having a shaft;

a stator;

a front housing having a first mounting stay disposed at a side of said front housing to be fixed to said cylinder block by a bolt having an outside diameter and a second mounting stay disposed at the opposite side of said front housing with respect to said shaft to be fixed to said cylinder head by a bolt having the same outside diameter;

a rear housing having a third mounting stay to be fixed to said cylinder head at the same side of said rear housing as said second mounting stay; and a pulley fixed to a front end of said shaft to be driven by said engine via a belt; wherein said first mounting stay has an elliptical first bolt-hole extending perpendicularly to said stack direction and having a major axis in parallel to said stack direction and a minor axis perpendicular to said stack direction;

said second mounting stay has a circular second bolt-hole having a diameter not larger than said minor axis and extending approximately in the same direction as said first bolt-hole, and said third mounting stay has a circular third bolt-hole extending in parallel with said second bolt-hole.

7. The vehicle rotary electric machine as claimed in claim 6, wherein said second mounting stay comprises a pair of members spaced apart from each other at a distance, and said second bolt-hole formed in one of said pair of members is different in diameter from said second bolt hole formed in the other member.

8. The vehicle rotary electric machine as claimed in claim 7, further comprising a bolt-guide member disposed between said pair of members, wherein said bolt-guide member has a continuous surface extending from said bolt-holes.

9. A vehicle rotary electric machine to be mounted in an engine having a cylinder head and a cylinder block stacked in a stack direction comprising:

a rotor having a shaft;

a stator;

a housing having a first mounting stay disposed at a side of said front housing to be fixed to said cylinder block by a bolt and a second mounting stay disposed at the opposite side of said housing with respect to said shaft to be fixed to said cylinder head by a bolt having the same outside diameter; and a pulley fixed to a front end of said shaft to be driven by said engine via a belt; wherein said first mounting stay has an elliptical first bolt-hole extending perpendicularly to said stack direction and having a major axis extending in parallel to said stack direction; and said second mounting stay has a circular second bolt-hole extending approximately in the same direction as said first bolt-hole.

10. The vehicle rotary electric machine as claimed in claim 9, wherein said second mounting stay comprises a pair of members spaced apart from each other at a distance, and said second bolt-hole formed in one of said pair of members is different in diameter from said second bolt hole formed in the other member.

11. The vehicle rotary electric machine as claimed in claim 10, further comprising a bolt-guide member disposed between said pair of members, wherein said bolt-guide member has a continuous surface extending from the bolt-holes.

* * * * *